(12) United States Patent
Xu et al.

(10) Patent No.: US 10,470,002 B2
(45) Date of Patent: Nov. 5, 2019

(54) METHODS AND APPARATUSES FOR PROCESSING INDICATION INFORMATION

(71) Applicant: ZTE Corporation, Shenzhen (CN)

(72) Inventors: Hui Xu, Shenzhen (CN); Zijiang Ma, Shenzhen (CN); Chen Lu, Shenzhen (CN); Hongjun Liu, Shenzhen (CN); Yaying Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 43 days.

(21) Appl. No.: 15/525,195

(22) PCT Filed: Apr. 13, 2015

(86) PCT No.: PCT/CN2015/076488
§ 371 (c)(1),
(2) Date: May 8, 2017

(87) PCT Pub. No.: WO2016/070572
PCT Pub. Date: May 12, 2016

(65) Prior Publication Data
US 2018/0288576 A1    Oct. 4, 2018

(30) Foreign Application Priority Data
Nov. 7, 2014    (CN) .......................... 2014 1 0623566

(51) Int. Cl.
*H04W 72/00*    (2009.01)
*H04W 4/06*    (2009.01)
*H04W 28/02*    (2009.01)

(52) U.S. Cl.
CPC ......... *H04W 4/06* (2013.01); *H04W 28/0289* (2013.01); *H04W 72/005* (2013.01)

(58) Field of Classification Search
CPC .. H04W 4/06; H04W 28/0289; H04W 72/005
See application file for complete search history.

(56) References Cited

U.S. PATENT DOCUMENTS

2005/0233732 A1    10/2005    Kwak
2013/0215761 A1*   8/2013    Xu ........................ H04W 24/08
                                                                370/241
(Continued)

FOREIGN PATENT DOCUMENTS

CN    102695129 A    9/2012
CN    102740234 A    10/2012
(Continued)

OTHER PUBLICATIONS

International Search Report for corresponding application PCT/CN2015/076488 filed on Apr. 13, 2015; Mail date 17, 2015.
(Continued)

*Primary Examiner* — Chi Ho A Lee
(74) *Attorney, Agent, or Firm* — Cantor Colburn LLP

(57) ABSTRACT

Provided are methods and apparatuses for processing indication information. According to a method for processing indication information, a predetermined network element determines a Multimedia Broadcast Multicast Service (MBMS) to be suspended; and the predetermined network element sends, to an Evolved Node B (eNB), indication information used for indicating that the MBMS is to be suspended. The indication information is used for indicating the eNB receiving the indication information to send Multicast Channel (MCH) Scheduling Information (MSI) to User Equipment (UE), and the MSI includes a specific value used for notifying the UE of the MBMS to be suspended.

18 Claims, 6 Drawing Sheets

```
A predetermined network element determines an MBMS to be     ~ S302
                      suspended The predetermined network element sends, to an eNB, indication
    information used for indicating that the MBMS is to be
    suspended, where the indication information is used for        ~ S304
 indicating the eNB receiving the indication information to send
    MSI to UE, and the MSI includes a specific value used for
       notifying the UE of the MBMS to be suspended
```

(56) References Cited

U.S. PATENT DOCUMENTS

| | | | | |
|---|---|---|---|---|
| 2014/0198711 A1* | 7/2014 | Chang | ................. | H04W 4/06 |
| | | | | 370/312 |
| 2016/0094358 A1* | 3/2016 | Won | ................. | H04L 12/1881 |
| | | | | 370/230 |
| 2016/0157065 A1* | 6/2016 | Lee | ................. | H04W 4/08 |
| | | | | 370/312 |
| 2016/0192327 A1* | 6/2016 | Yi | ................. | H04W 72/005 |
| | | | | 370/312 |
| 2016/0309522 A1* | 10/2016 | Li | ................. | H04W 4/06 |
| 2017/0251341 A1* | 8/2017 | Frost | ................. | H04W 72/005 |
| 2017/0302465 A1* | 10/2017 | Wang | ................. | H04W 72/005 |
| 2017/0339531 A1* | 11/2017 | Kim | ................. | H04W 4/06 |
| 2019/0037533 A1* | 1/2019 | Huang | ................. | H04W 4/06 |

FOREIGN PATENT DOCUMENTS

| | | |
|---|---|---|
| CN | 102761825 A | 10/2012 |
| CN | 102790948 A | 11/2012 |
| CN | 102932743 A | 2/2013 |
| EP | 2728912 A1 | 8/2012 |
| EP | 2563050 A1 | 2/2013 |
| EP | 2690894 A1 | 1/2014 |
| WO | 2012155408 A1 | 11/2012 |

OTHER PUBLICATIONS

3GPP TSG RAN WG3 Meeting #85bis, "Proposed concept for eMBMS congestion management", Shanghai, China Oct. 6-10, 2014, XP50870853A.

European Search Report for corresponding application EP15857206; Report dated Sep. 22, 2017.

* cited by examiner

METHODS AND APPARATUSES FOR PROCESSING INDICATION INFORMATION

TECHNICAL FIELD

The present disclosure relates to the field of communications, and more particularly to methods and apparatuses for processing indication information.

BACKGROUND

Along with rapid development of the Internet and popularization of large-screen multifunctional mobile phones, a great deal of mobile data multimedia services and various high-bandwidth multimedia services emerge, such as video conferencing, television broadcasting, video on demand, advertising, online education and interactive games. Increasing service requirements of mobile users are met on one hand, and on the other hand, new service increasing points are also brought to mobile operating companies. These mobile data multimedia services require multiple users to simultaneously receive the same data. Compared with ordinary data services, these services have the characteristics of large data volume, long duration, time delay sensitivity and the like.

In order to effectively utilize mobile network resources, the 3rd Generation Partnership Project (3GPP) proposes a Multimedia Broadcast Multicast Service (MBMS). The MBMS is a technology of transmitting data from one data source to multiple targets to implement sharing of a network (including a core network and an access network) resource and increase a utilization rate of the network resource (particularly an air interface resource). The MBMS defined by the 3GPP may not only implement pure-text and low-rate message multicast and broadcast but also implement high-speed multimedia service broadcast and multicast to provide rich video, audio and multimedia services, which undoubtedly conforms to a development tendency of mobile data in the future and provides a broader service prospect for development of 3rd Generation (3G).

In Long Term Evolution (LTE), an MBMS may adopt a multicast mode, called as a Multicast/Broadcast over Single Frequency Network (MBSFN) sending mode. The MBMS adopting the multicast mode is also called as an MBSFN service, and multiple cells may adopt the same modulation and coding scheme and send the same content by adopting the same physical resource. Multi-cell transmission of the MBMS has the following characteristics: 1) the MBMS is synchronously transmitted in an MBSFN area; 2) combination of MBMS transmission in multiple cells is supported; 3) a Multicast Traffic Channel (MTCH) and a Multicast Control Channel (MCCH) are mapped to a Multicast Channel (MCH) in a Point-to-Multipoint (p-T-m) mode; and 4) an MBSFN synchronization area, an MBSFN area, MBSFN transmission, advertisement and a preserved cell are all semi-statically configured by an Operation Administration and Maintenance (OAM). In such a manner, User Equipment (UE) of multiple cells may receive multiple pieces of MBMS data with the same content and perform Single Frequency Network (SFN) combination, thereby increasing a gain of a received signal. Multiple cells which send the same MBMS by adopting the same physical resource and an MBSFN sending mode form an MBSFN area.

During practical LTE networking, a plurality of MBSFN services exist in one MBSFN area and all of these MBSFN services belonging to the same MBSFN area form one MBSFN service group. In other words, one MBSFN service group belongs to only one MBSFN area. One MBSFN area includes multiple cells, and one and the same MBSFN service group is configured for each cell. Data channels MTCHs with multiple MBSFN services of the same MBSFN area and a control channel MCCH of the MBSFN services may be multiplexed to one MCH. An MCCH and multiple MTCHs of the same MBSFN area, i.e. multiple logical channels, may be mapped to the same transmission channel MCH.

An MCH is borne through a Transport Block (TB) of an MBSFN sub-frame.

In communication technologies, an MCH Sub-frame Allocation Pattern (MSAP) occasion is introduced into the concept of MSAP, and indicates all multicast resources included in one MCH corresponding a certain MSAP within a time period of a dynamic scheduling period. In one MSAP occasion, multiple MTCHs and dynamic scheduling information may be sent, and an MCCH may also be included. The dynamic scheduling information is borne in a Media Access Control (MAC) Protocol Data Unit (PDU) Control Element (CE), and a length of the MSAP occasion may be 320 ms. A time length of one MSAP occasion is one scheduling period, and is also called as one dynamic scheduling period. One or more MBSFN sub-frames in one or more MBSFN frames are allocated for one MCH through an MSAP, where a sub-frame sent in a multicast mode is called as an MBSFN sub-frame, and a frame including MBSFN sub-frames is called as an MBSFN frame.

On each MSAP occasion configured for one MCH, dynamic scheduling information is borne, and mapping information from MTCHs to auxiliary MSAP sub-frames is contained. The mapping information is determined by virtue of a number index relationship of MBSFN sub-frames in a scheduling period. UE may read the scheduling information to know allocation of each MTCH on the MBSFN sub-frames, and the UE may read an interested MTCH on the corresponding MBSFN sub-frames and neglect the MBSFN sub-frames not required to be read, so that MBMS receiving efficiency of the UE is improved, and power consumption of the UE is reduced. Here, numbers of the MBSFN sub-frames are determined as follows: all MBSFN sub-frames allocated for an MCH within one scheduling period are sequentially arranged and sequentially numbered.

In a related LTE technology, multiple logical channels multiplex the same MCH in a manner as follows. One sub-frame corresponds to one Transmission Time Interval (TTI), one TB may be sent in one TTI and each TB corresponds to one MAC PDU. One MAC PDU may include multiple MAC Service Data Units (SDUs), and these MAC SDUs may be from different logical channels, the logical channels probably including an MTCH, an MCCH and the like. Data from different logical channels is sent together on a physical channel after being connected in series in the MAC PDUs.

An MCH Scheduling Information (MSI) MAC CE is shown in FIG. 1. As shown in Table 1, a MAC PDU sub-header containing a Logical Channel Identifier (LCID) is adopted for identification. The MAC CE has a variable length, which is 2× bytes (where x is the number of elements in an MBMS-SessionInfoList sequence). Each MTCH includes the following fields:

LCID: this field indicates an LCID of the MTCH, and a length of the field is 5 bits; and Stop MTCH: this field indicates a sequence number of a stop sub-frame of the corresponding MTCH in an MSAP occasion, and a length of the field is 11 bits. A specific Stop MTCH value 2047 indicates that the corresponding MTCH is not scheduled, and values ranging from 2043 to 2046 are reserved.

FIG. 1 is a schematic diagram of a dynamic scheduling information MAC CE according to a related technology. As shown in FIG. 1, when a certain MTCH in a MAC PDU is not sent, the stop MTCH is identified by 2047. Even when all MTCHs have no data, MSI is still sent. If the MSI is not sent (there is an MBMS service indicator in an MCCH), UE considers that a base station (e.g., an Evolved Node B (eNB)) has an error.

FIG. 2 is a schematic diagram of an MBMS trunking communication system according to the related technology. As shown in FIG. 2, the trunking communication system is a dedicated wireless communication system developed to meet a commanding and scheduling requirement of a user in the industry and oriented to a specific industrial application. A large number of wireless users share a small number of wireless channels in the system. The system takes commanding and scheduling as a main application, and is a multipurpose and high-performance wireless communication system. The trunking communication system has a broad application prospect in the fields of government departments, public security, emergency communication, power, civil aviation, petrochemical industry, military and the like. Trunking communication in 3GPP LTE is called as a Group Communication Service Enabler (GCSE).

The 3GPP decides to adopt an MBMS technology to implement public network LTE trunking communication, and makes further researches on Mission-Critical Push-To-Talk (MCPTT). At present, the 3GPP is discussing about how to ensure continuity of a trunking service in case of user plane data congestion of an MBMS. One solution is that an eNB notifies a Multi-cell/Multicast Coordination Entity (MCE) of occurrence of congestion or overload, the MCE selects to suspend the MBMS, and the eNB notifies influenced UE.

However, it is found in a researching and practising process of the related technology that the following problem exists: for how to notify an eNB by an MCE and how to notify influenced UEs by the eNB when the MCE receives congestion or overload indication information and selects to suspend an MBMS, there are yet no solutions.

For the problem of how to notify an eNB when a network element receives congestion or overload indication information and selects to suspend an MBMS in the related technology, there is yet no effective solution.

SUMMARY

Some embodiments of the present disclosure provide methods and apparatuses for processing indication information, so as to at least solve the problem of how to notify an eNB when a network element receives congestion or overload indication information and selects to suspend an MBMS in the related technology.

According to an embodiment of the present disclosure, a method for processing indication information is provided, which may include the following acts. A predetermined network element determines an MBMS to be suspended. The predetermined network element sends, to an eNB, indication information used for indicating that the MBMS is to be suspended. The indication information may be used for indicating the eNB receiving the indication information to send MSI to UE, and the MSI may include a specific value used for notifying the UE of the MBMS to be suspended.

In the embodiment of the present disclosure, the MSI may be sent when the eNB receives the indication information sent by the predetermined network element and data of the MBMS to be suspended continues to be sent at an air interface; or, the MSI may be sent after the eNB receives the indication information sent by the predetermined network element and data of the MBMS to be suspended stops being sent at an air interface.

In the embodiment of the present disclosure, the indication information may contain MBMS scheduling information and/or at least one of the following information: an MBSFN area Identifier (ID) of an MBSFN area to which the MBMS belongs, an MBMS ID identifying the MBMS or a timestamp used for indicating a time for the eNB to send the MSI to the UE.

In the embodiment of the present disclosure, the predetermined network element may determine the MBMS to be suspended in at least one of the following manners:

after congestion or overload indication information about user plane congestion or overload is received, statistics about the number of UEs influenced by the user plane congestion or overload is collected, and an MBMS of which the number of influenced UEs is smaller than a predetermined number is selected to be suspended;

priorities of MBMSs on an MCH are sequenced, and an MBMS of which a priority is lower than a predetermined priority is selected to be suspended;

resources occupied by MBMSs are determined, and an MBMS which occupies an amount of resources exceeding a predetermined value is selected to be suspended;

a corresponding MBMS determined to be used for reducing user plane radio resources according to a local algorithm of the predetermined network element is selected to be suspended;

an MBMS for alleviating the user plane congestion or overload is selected to be suspended;

an MBMS of which a service rate exceeds a predetermined rate is selected to be suspended;

an MBMS which is not stopped within a predetermined time range is selected to be suspended;

an MBMS of which a data volume is larger than a predetermined data volume is selected to be suspended; or an MBMS specified, by an operating company, to be suspended is selected to be suspended.

In the embodiment of the present disclosure, the predetermined network element may include one of: an MCE, a Mobility Management Entity (MME), an MBMS GateWay (MBMS-GW), a Broadcast Multicast Service Center (BM-SC), an OAM or an Application Server (AS).

According to another embodiment of the present disclosure, a method for processing indication information is provided, which may include the following acts. An eNB receives, from a predetermined network element, indication information used for indicating that an MBMS is to be suspended. The eNB sends MSI to UE according to the indication information. The MSI may include a specific value used for notifying the UE of the MBMS to be suspended.

In the embodiment of the present disclosure, the indication information may contain MBMS scheduling information and/or at least one of the following information: an MBSFN area ID of an MBSFN area to which the MBMS belongs, an MBMS ID identifying the MBMS or a timestamp used for indicating a time for the eNB to send the MSI to the UE.

The eNB may send suspending notification information to the UE in multiple manners. Besides sending via the MSI, the eNB may also send the suspending notification information to the UE according to the indication information in at least one of the following manners: Radio Resource Control (RRC) signaling, Layer 1 or Layer 2 (L1 or L2) signaling or Packet Data Convergence Protocol (PDCP) signaling.

According to another embodiment of the present disclosure, a method for processing indication information is provided, which may include the following acts. MSI sent by an eNB is received. The MSI may include a specific value used for notifying UE of an MBMS to be suspended. The MBMS is processed according to the received MSI.

In the embodiment of the present disclosure, indication information used for indicating to process the MBMS to be suspended may be sent to an AS, an operation may be performed according to a Stop MTCH indication corresponding to the MBMS, and subsequent MSI and MCCH message may continue to be monitored. Under a condition that the MBMS is configured on an MCCH in a next MCCH modification period, the MBMS may be received by adopting a multicast bearer, and the AS may be requested to release a unicast bearer corresponding to the MBMS.

According to another embodiment of the present disclosure, a method for processing indication information is provided, which may include the following acts. A predetermined network element determines an MBMS to be suspended. The predetermined network element sends, to an eNB, indication information used for indicating that the MBMS is to be suspended. The eNB sends MSI to UE after receiving the indication information. The MSI may include a specific value used for notifying the UE of the MBMS to be suspended.

According to another embodiment of the present disclosure, an apparatus for processing indication information is provided, which may be applied to a predetermined network element and include a determination module and a first sending module. The determination module may be arranged to determine an MBMS to be suspended. The first sending module may be arranged to send, to an eNB, indication information used for indicating that the MBMS is to be suspended. The indication information may be used for indicating the eNB receiving the indication information to send MSI to UE, and the MSI may include a specific value used for notifying the UE of the MBMS to be suspended.

In the embodiment of the present disclosure, the MSI may be sent when the eNB receives the indication information sent by the predetermined network element and data of the MBMS to be suspended continues to be sent at an air interface; or, the MSI may be sent after the eNB receives the indication information sent by the predetermined network element and data of the MBMS to be suspended stops being sent at an air interface.

In the embodiment of the present disclosure, the determination module may include at least one of:

a first selection unit, arranged to, after congestion or overload indication information about user plane congestion or overload is received, collect statistics about the number of UEs influenced by the user plane congestion or overload, and select to suspend an MBMS of which the number of influenced UEs is smaller than a predetermined number;

a second selection unit, arranged to sequence priorities of MBMSs on an MCH, and select to suspend an MBMS of which a priority is lower than a predetermined priority;

a third selection unit, arranged to determine resources occupied by MBMSs, and select to suspend an MBMS which occupies an amount of resources exceeding a predetermined value;

a fourth selection unit, arranged to select to suspend a corresponding MBMS determined to be used for reducing user plane radio resources according to a local algorithm of the predetermined network element;

a fifth selection unit, arranged to select to suspend an MBMS for alleviating the user plane congestion or overload;

a sixth selection unit, arranged to select to suspend an MBMS of which a service rate exceeds a predetermined rate;

a seventh selection unit, arranged to select to suspend an MBMS which is not stopped within a predetermined time range;

an eighth selection unit, arranged to select to suspend an MBMS of which a data volume is larger than a predetermined data volume; or a ninth selection unit, arranged to select to suspend an MBMS specified, by an operating company, to be suspended.

According to another embodiment of the present disclosure, an apparatus for processing indication information is provided, which may be applied to an eNB and include a first receiving module and a second sending module. The first receiving module may be arranged to receive, from a predetermined network element, indication information used for indicating that an MBMS is to be suspended. The second sending module may be arranged to send MSI to UE according to the indication information. The MSI may include a specific value used for notifying the UE of the MBMS to be suspended.

According to another embodiment of the present disclosure, an apparatus for processing indication information is provided, which may be applied to UE and include a second receiving module and a processing module. The second receiving module may be arranged to receive MSI sent by an eNB. The MSI may include a specific value used for notifying the UE of an MBMS to be suspended. The processing module may be arranged to process the MBMS according to the received MSI.

In the embodiment of the present disclosure, the processing module may include a determination unit and a requesting unit. The determination unit may be arranged to send, to an AS, indication information used for indicating to process the MBMS to be suspended, perform an operation according to a Stop MTCH indication corresponding to the MBMS, and continue monitoring subsequent MSI and MCCH message. The requesting unit may be arranged to, under a condition that the MBMS is configured on an MCCH in a next MCCH modification period, receive the MBMS by adopting a multicast bearer, and request the AS to release a unicast bearer corresponding to the MBMS.

According to another embodiment of the present disclosure, an apparatus for processing indication information is provided, which may include a determination module, a third sending module and a fourth sending module. The determination module may be applied to a predetermined network element and arranged to determine an MBMS to be suspended. The third sending module may be applied to the predetermined network element and arranged to send, to an eNB, indication information used for indicating that the MBMS is to be suspended. The fourth sending module may be applied to the eNB and arranged to send MSI to UE after receiving the indication information. The MSI may include a specific value used for notifying the UE of the MBMS to be suspended.

According to the embodiments of the present disclosure, the predetermined network element determines an MBMS to be suspended; and the predetermined network element sends, to the eNB, the indication information used for indicating that the MBMS is to be suspended. The indication information is arranged for the eNB to send the MSI to the UE, and the MSI includes the specific value used for notifying the UE of the MBMS to be suspended. The problem of how to notify the eNB and how to notify the influenced UEs by the eNB when the network element selects to suspend the MBMS in the related technology is solved, and effects of timely notifying the eNB and the UE and processing the suspended service by the UE are achieved.

BRIEF DESCRIPTION OF THE DRAWINGS

The drawings described here are adopted to provide a further understanding to the embodiments of the present disclosure, and form a part of the present disclosure. Schematic embodiments of the embodiments of the present disclosure and descriptions thereof are adopted to explain the embodiments of the present disclosure and not intended to form limits to the embodiments of the present disclosure. In the drawings.

DETAILED DESCRIPTION OF THE EMBODIMENTS

The embodiments of the present disclosure will be described below in detail with reference to the drawings and embodiments. The embodiments in the present disclosure and characteristics in the embodiments may be combined under the condition of no conflicts.

Figure 1:
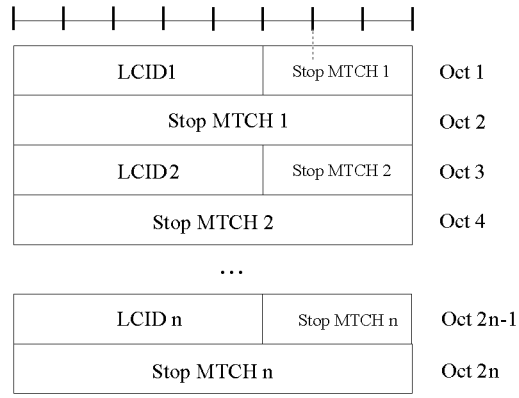
FIG. 1 is a schematic diagram of a dynamic scheduling information MAC CE according to the related technology.
Figure 2:
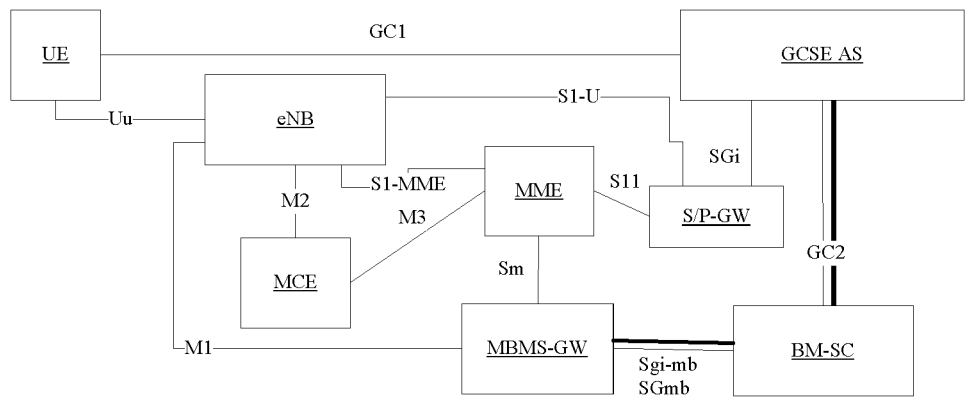
FIG. 2 is a schematic diagram of an MBMS trunking communication system according to the related technology.
Figure 3:
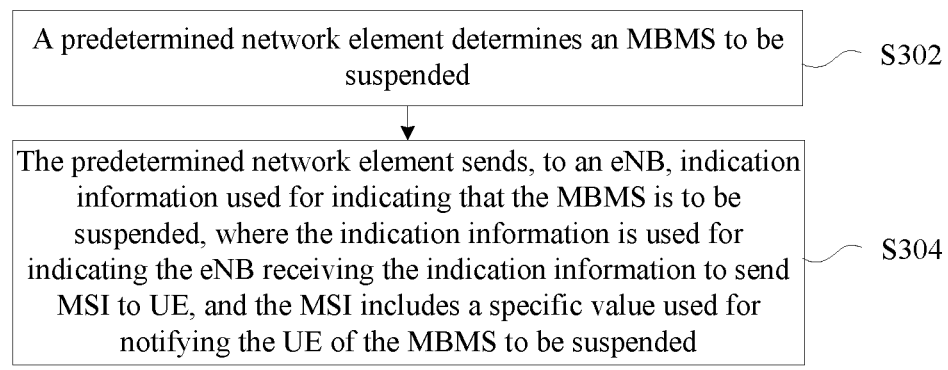
FIG. 3 is a first flowchart of a method for processing indication information according to an embodiment of the present disclosure.

An embodiment provides a method for processing indication information. FIG. 3 is a first flowchart of a method for processing indication information according to an embodiment of the present disclosure. As shown in FIG. 3, the flow includes the following acts S302 and S304.

At act S302, a predetermined network element determines an MBMS to be suspended.

At act S304, the predetermined network element sends, to an eNB, indication information used for indicating that the MBMS is to be suspended. The indication information is used for indicating the eNB receiving the indication information to send MSI to UE, and the MSI includes a specific value used for notifying the UE of the MBMS to be suspended.

By the acts, the predetermined network element determines the MBMS to be suspended; and the predetermined network element sends, to the eNB, the indication information used for indicating that the MBMS is to be suspended. The indication information is used for indicating the eNB to send the MSI to the UE, and the MSI includes the specific value used for notifying the UE of the MBMS to be suspended. The eNB in the embodiments may refer to all eNBs participating in MBSFN transmission in an MBSFN area to which the MBMS to be suspended belongs. The problem of how to notify the eNB when the network element receives the congestion or overload indication information and selects to suspend the MBMS in the related technology is solved, and effects of timely notifying the eNB and the UE and processing the suspended service by the UE are achieved.

The MSI may be sent when the eNB receives the indication information sent by the predetermined network element and data of the MBMS to be suspended continues to be sent at an air interface. Alternatively, the MSI may be sent after the eNB receives the indication information sent by the predetermined network element and data of the MBMS to be suspended stops being sent at an air interface. That is, the eNB may send the MSI when or after the MBMS is suspended. The eNB may receive the suspending indication information sent by the predetermined network element, but the data of the MBMS to be suspended may continue to be sent at the air interface. The sending the MSI after suspending may refer to that: the eNB receives the suspending indication information sent by the predetermined network element, and data of the MBMS to be suspended stops being sent at an air interface. The MBMS to be suspended continues to be sent for one or more MSI periods at the air interface, and stops being sent starting from a next MCCH modification period at most.

In the embodiment of the present disclosure, the indication information may contain MBMS scheduling information and/or at least one of the following information: an MBSFN area ID of an MBSFN area to which the MBMS belongs, an MBMS ID identifying the MBMS or a timestamp used for indicating a time for the eNB to send the MSI to the UE. The timestamp may be used for indicating a time when all the eNBs participating in MBSFN transmission in the MBSFN area to which the MBMS belongs send the MSI containing the specific value.

In the embodiment of the present disclosure, the predetermined network element may determine the MBMS to be suspended in at least one of the following manners:

after congestion or overload indication information about user plane congestion or overload is received, statistics about the number of UEs influenced by the user plane congestion or overload is collected, and an MBMS of which the number of influenced UEs is smaller than a predetermined number is selected to be suspended;

priorities of MBMSs on an MCH are sequenced, and an MBMS of which a priority is lower than a predetermined priority is selected to be suspended;

resources occupied by MBMSs are determined, and an MBMS which occupies an amount of resources exceeding a predetermined value is selected to be suspended;

a corresponding MBMS determined to be used for reducing user plane radio resources according to a local algorithm of the predetermined network element is selected to be suspended;

an MBMS for alleviating the user plane congestion or overload is selected to be suspended; an MBMS of which a service rate exceeds a predetermined rate is selected to be suspended;

an MBMS which is not stopped within a predetermined time range is selected to be suspended;

an MBMS of which a data volume is larger than a predetermined data volume is selected to be suspended; or an MBMS specified, by an operating company, to be suspended is selected to be suspended.

In the embodiment of the present disclosure, the predetermined network element may include one of: an MCE, an MME, an MBMS-GW, a BM-SC, an OAM or an AS.

Figure 4:
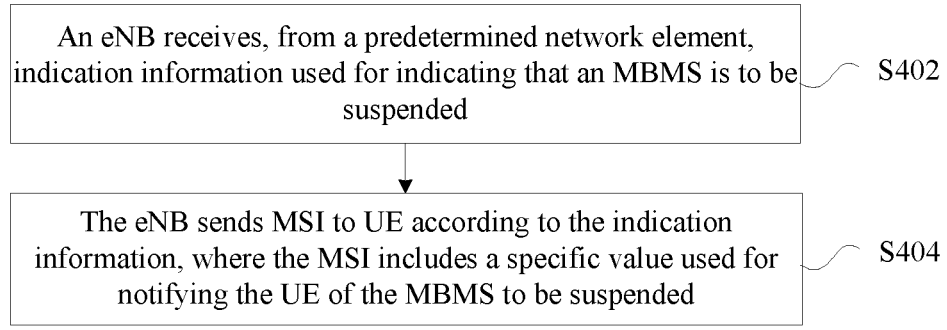
FIG. 4 is a second flowchart of a method for processing indication information according to an embodiment of the present disclosure.

An embodiment of the present disclosure provides a method for processing indication information. FIG. 4 is a second flowchart of a method for processing indication information according to an embodiment of the present disclosure. As shown in FIG. 4, the method includes the following acts S402 and S404.

At act S402, an eNB receives, from a predetermined network element, indication information used for indicating that an MBMS is to be suspended.

At act S404, the eNB sends MSI to UE according to the indication information. The MSI includes a specific value used for notifying the UE of the MBMS to be suspended.

By the acts, the eNB receives the indication information used for indicating that the MBMS is to be suspended from the predetermined network element, and the eNB sends the MSI to the UE according to the indication information. The MSI includes the specific value used for notifying the UE of the MBMS to be suspended. The problem of how to notify the eNB when the network element receives congestion or overload indication information and selects to suspend the MBMS in the related technology is solved, and an effect of timely notifying the eNB can be achieved.

In the embodiment of the present disclosure, the indication information may contain MBMS scheduling information and/or at least one of the following information: an MBSFN area ID of an MBSFN area to which the MBMS belongs, an MBMS ID identifying the MBMS or a timestamp used for indicating a time for the eNB to send the MSI to the UE.

In the embodiment of the present disclosure, besides sending via the MSI, the eNB may send the suspending notification information to the UE according to the indication information in one of the following manners: RRC signaling, L1 or L2 signaling or PDCP signaling.

Figure 5:
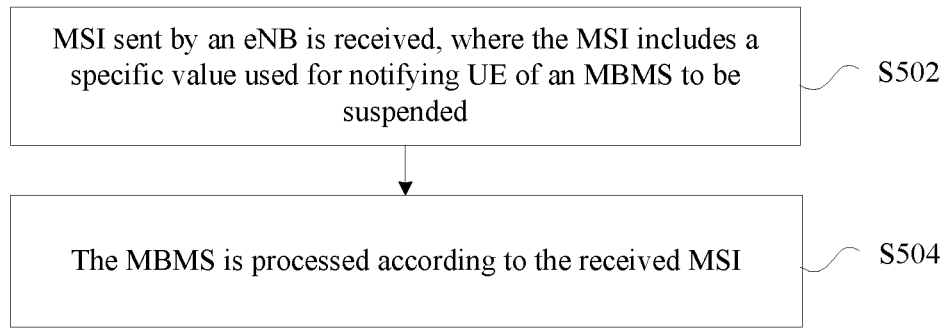
FIG. 5 is a third flowchart of a method for processing indication information according to an embodiment of the present disclosure.

An embodiment of the present disclosure further provides a method for processing indication information. FIG. 5 is a third flowchart of a method for processing indication information according to an embodiment of the present disclosure. As shown in FIG. 5, the method includes the following acts S502 and S504.

At act S502, MSI sent by an eNB is received. The MSI includes a specific value used for notifying UE of an MBMS to be suspended.

At act S504, the MBMS is processed according to the received MSI.

By the acts, the MSI sent by the eNB is received, where the MSI includes the specific value used for notifying the UE of the MBMS to be suspended. The MBMS is processed according to the received MSI. The problem of how to notify the eNB when a network element receives congestion or overload indication information and selects to suspend the MBMS in the related technology is solved, and an effect of timely notifying the eNB can be achieved.

The specific value may refer to that a stop MTCH in the MSI is a specific value. The specific value may refer to a reserved value in the related technology. According to a present conclusion, 2047 is used in MSI to identify that an MTCH is not scheduled and 2043-2046 are reserved values. Therefore, 2043 or 2046 may be adopted to indicate that the MBMS is to be suspended. The specific value may be arranged at a header, tail or middle in the MSI. If the specific value is arranged at the tail of the MSI, UE with a trunking function needs to read all of the MSI, as shown in Table 1.

TABLE 1

| LCID1 | Stop MTCH1 = 3 |
| LCID2 | Stop MTCH2 = 5 |
| LCID3 | Stop MTCH3 = 10 |
| LCID2 | Stop MTCH2 = 2043 or 2046 |

In Table 1, the LCID2 is suspended, and this information is indicated at the tail of the MSI, then trunking UE interested in receiving the LCID2 needs to read all of the MSI. A conventional UE (for example, UE before R12) only needs to read a content of an interested LCID.

If a specific value for suspension indication is arranged at the header of the MSI, a conventional UE only needs to read the interested LCID (it is unnecessary for the UE to read all of the MSI), and a trunking UE only needs to continue reading the interested LCID after reading the specific value, as shown in Table 2.

TABLE 2

| LCID2 | Stop MTCH2 = 2043 or 2046 |
| LCID1 | Stop MTCH1 = 3 |
| LCID2 | Stop MTCH2 = 5 |
| LCID3 | Stop MTCH3 = 10 |

If the specific value for suspension indication is arranged at the middle of the MSI, as shown in the following table, a conventional UE only needs to read the interested LCID (it is unnecessary for the UE to read all of the MSI), and a trunking UE needs to read the interested LCID twice, one being a normal stop MTCH value and the other being a stop MTCH with a specific value, as shown in Table 3 or 4.

TABLE 3

| LCID1 | Stop MTCH1 = 3 |
| LCID2 | Stop MTCH2 = 5 |
| LCID2 | Stop MTCH2 = 2043 or 2046 |
| LCID3 | Stop MTCH3 = 10 |

TABLE 4

| LCID1 | Stop MTCH1 = 3 |
| LCID2 | Stop MTCH2 = 2043 or 2046 |
| LCID2 | Stop MTCH2 = 5 |
| LCID3 | Stop MTCH3 = 10 |

As an optional implementation mode, the act that the MBMS is processed according to the received MSI may include the following acts. Indication information used for indicating to process the MBMS to be suspended is sent to an AS. An operation is performed according to a Stop MTCH indication corresponding to the MBMS, and subsequent MSI and MCCH message continues to be monitored. The subsequent MSI may refer to one or more pieces of MSI after the current MSI. The subsequent MCCH message refers to one or more MCCH messages in a next MCCH modification period. Under a condition that the MBMS is configured on an MCCH in the next MCCH modification period, the MBMS is received by adopting a multicast bearer, and the AS is requested to release a unicast bearer corresponding to the MBMS.

If the MSI is sent after the MBMS to be suspended has been suspended, as shown in the following table:

TABLE 5

| LCID1 | Stop MTCH1 = 3 |
| LCID2 | Stop MTCH2 = 2047 |
| LCID3 | Stop MTCH3 = 8 |
| LCID2 | Stop MTCH2 = 2043 or 2046 |

As shown in the table, LCID2 has been suspended, specifically, stop MTCH2=2047 indicates that LCID2 has been suspended. The UE continues monitoring the MSI and the MCCH message after receiving a suspending notification indication of the MBMS.

An embodiment of the present disclosure further provides a method for processing indication information, which includes that the following acts. A predetermined network element determines an MBMS to be suspended. The predetermined network element sends, to an eNB, indication information used for indicating that the MBMS is to be suspended. The eNB sends MSI to UE after receiving the indication information. The MSI includes a specific value used for notifying the UE of the MBMS to be suspended.

An embodiment of the present disclosure provides an apparatus for processing indication information, which is applied to a predetermined network element. The apparatus may be arranged to implement the abovementioned embodiments and exemplary implementation modes, and what has been described will not be elaborated. For example, term "module", used below, may be a combination of software and/or hardware capable of realizing a preset function. Although the apparatus described in the following embodiment is preferably implemented with software, implementation with hardware or a combination of the software and the hardware is also possible and conceivable.

Figure 6:
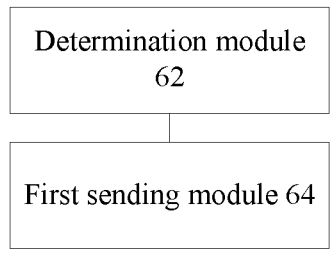
FIG. 6 is a first block diagram of an apparatus for processing indication information according to an embodiment of the present disclosure.

FIG. 6 is a first block diagram of an apparatus for processing indication information according to an embodiment of the present disclosure. As shown in FIG. 6, the apparatus includes:

a determination module 62, arranged to determine an MBMS to be suspended; and a first sending module 64, arranged to send, to an eNB, indication information used for indicating that the MBMS is to be suspended. The indication information is used for indicating the eNB receiving the indication information to send MSI to UE, and the MSI includes a specific value used for notifying the UE of the MBMS to be suspended.

In an exemplary embodiment, the determination module 62 may include at least one of:

a first selection unit, arranged to, after congestion or overload indication information about user plane congestion or overload is received, collect statistics about the number of UEs influenced by the user plane congestion or overload, and select to suspend an MBMS of which the number of influenced UEs is smaller than a predetermined number;

a second selection unit, arranged to sequence priorities of MBMSs on an MCH, and select to suspend an MBMS of which a priority is lower than a predetermined priority;

a third selection unit, arranged to determine resources occupied by MBMSs, and select to suspend an MBMS which occupies an amount of resources exceeding a predetermined value;

a fourth selection unit, arranged to select to suspend a corresponding MBMS determined to be used for reducing user plane radio resources according to a local algorithm of the predetermined network element;

a fifth selection unit, arranged to select to suspend an MBMS for alleviating the user plane congestion or overload;

a sixth selection unit, arranged to select to suspend an MBMS of which a service rate exceeds a predetermined rate;

a seventh selection unit, arranged to select to suspend an MBMS which is not stopped within a predetermined time range;

an eighth selection unit, arranged to select to suspend an MBMS of which a data volume is larger than a predetermined data volume; or a ninth selection unit, arranged to select to suspend an MBMS which is specified. by an operating company, to be suspended.

Figure 7:
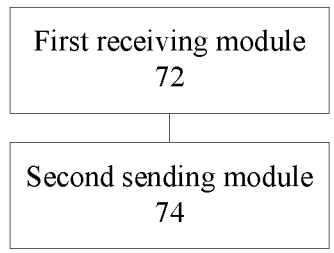
FIG. 7 is a second block diagram of an apparatus for processing indication information according to an embodiment of the present disclosure.

An embodiment of the present disclosure provides an apparatus for processing indication information, which is applied to an eNB. FIG. 7 is a second block diagram of an apparatus for processing indication information according to an embodiment of the present disclosure. As shown in FIG. 7, the apparatus includes:

a first receiving module 72, arranged to receive, from a predetermined network element, indication information used for indicating that an MBMS is to be suspended; and a second sending module 74, arranged to send MSI to UE according to the indication information. The MSI includes a specific value used for notifying the UE of the MBMS to be suspended.

Figure 8:
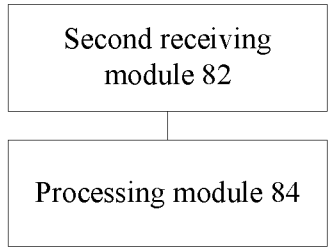
FIG. 8 is a third block diagram of an apparatus for processing indication information according to an embodiment of the present disclosure.

An embodiment of the present disclosure further provides an apparatus for processing indication information, which is applied to UE. FIG. 8 is a third block diagram of an apparatus for processing indication information according to an embodiment of the present disclosure. As shown in FIG. 8, the apparatus includes:

a second receiving module 82, arranged to receive MSI sent by an eNB. The MSI includes a specific value used for notifying the UE of an MBMS to be suspended; and a processing module 84, arranged to process the MBMS according to the received MSI.

Figure 9:
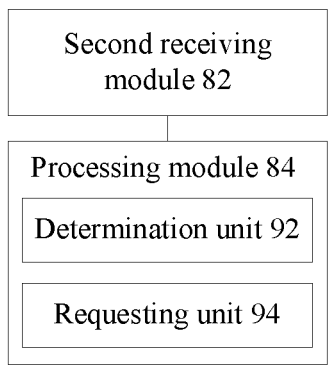
FIG. 9 is a first block diagram of an apparatus for processing indication information according to an exemplary embodiment of the present disclosure.

FIG. 9 is a first block diagram of an apparatus for processing indication information according to an exemplary embodiment of the present disclosure. As shown in FIG. 9, the processing module 84 includes:

a determination unit 92, arranged to send, to an AS, indication information used for indicating to process the MBMS to be suspended, perform an operation according to a Stop MTCH indication corresponding to the MBMS, and continue monitoring subsequent MSI and MCCH message; and a requesting unit 94, arranged to, under a condition that the MBMS is configured on an MCCH in a next MCCH modification period, receive the MBMS by adopting a multicast bearer, and request the AS to release a unicast bearer corresponding to the MBMS.

According to another embodiment of the embodiments of the present disclosure, an apparatus for processing indication information is provided, which includes a determination module, a third sending module and a fourth sending module. The determination module is applied to a predetermined network element and arranged to determine an MBMS to be suspended. The third sending module is applied to the predetermined network element and arranged to send, to an eNB, indication information used for indicating that the MBMS is to be suspended. The fourth sending module is applied to the eNB and arranged to send MSI to UE after receiving the indication information. The MSI includes a specific value used for notifying the UE of the MBMS to be suspended.

The embodiments of the present disclosure will be further described below with reference to alternative implementation modes.

An embodiment of the present disclosure provides a method for notifying suspending of an MBMS. According to the method, a network element determines an MBMS to be suspended, and sends indication information to an eNB, including a suspended MBSFN area ID, a service ID and a timestamp. The eNB sends MSI to influenced UEs at a time indicated by the timestamp, the MSI including a reserved value used for notifying the UE of an MBMS to be suspended. The UE performs further processing after receiving the MSI. When the MBMS is suspended, service interruption time during suspending may be reduced, communication service continuity of the MBMS may be ensured, and user experiences may be improved.

According to a present conclusion, 2047 is used in MSI to identify that an MTCH is not scheduled and 2043-2046 are reserved. Therefore, 2043 or 2046 may be adopted to indicate that the MBMS is to be suspended, as shown in Table 5a.

TABLE 5a

Definition about stop MTCH Field in MSI

| Index | Content Type |
|---|---|
| 0-2042 | Stop MTCH |
| 2043 or 2046 | Service is to be suspended |

In the embodiments provided below, unless otherwise specified, an MBMS in the embodiments of the present disclosure refers to, for example, an evolved MBMS, i.e. Evolved MBMS (eMBMS), an AS refers to, for example, a Group Communication Service Application Server (GCS AS), and group communication refers to, for example, trunking communication. At present, a trunking service is deployed on the GCS AS. Of course, other services may also be deployed on the GCS AS. In the embodiments of the present disclosure, for more convenient description, a service distributed by the GCS AS is called as a trunking service for short.

In an exemplary embodiment, configuration of an MCE refers to, for example, configuration of a centralized MCE in a network, and under such a situation, in an MBSFN area, there exist one MCE and a certain number of eNBs, and the MCE may communicate with the eNBs through M2 interfaces. Distributed MCE may refer to that the MCE and the eNBs in an MBSFN area are arranged together, and may also be understood in such a way that specific modules in the eNBs may realize functions and effects of the MCE, and under such a situation, in the MBSFN area, the number of the eNBs is equal to the number of the MCEs. In the embodiment of the present disclosure, for convenient description, for distributed MCE, an MME may communicate with an MCE module in an eNB through an M3 interface, and under such a situation, an M2 interface still exists as a logical interface. For a distributed MCE architecture, coordination between MCEs is implemented through an OAM. Unless otherwise specified, the embodiment of the present disclosure may be applied to a centralized or distributed MCE architecture. In the embodiment of the present disclosure, if a distributed MCE architecture is adopted, MCEs may communicate with eNBs through M2 interfaces, which actually implements internal communication between the eNBs and their own MCE modules. Service suspending in the embodiment of the present disclosure may refer to that an eNB stops sending of a service (which may continue to be sent in a core network) in an access network and releases a corresponding access network resource.

Figure 10:
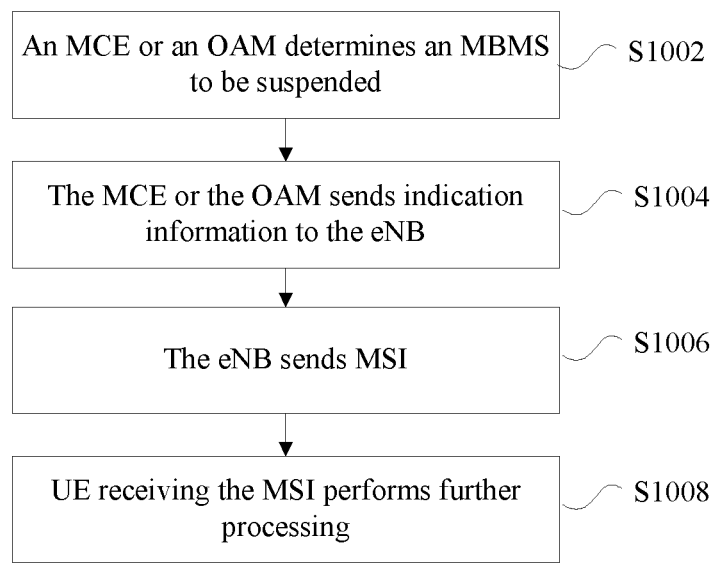
FIG. 10 is a first flowchart of a method for implementing MBMS congestion or overload indication according to an exemplary embodiment of the present disclosure.

FIG. 10 is a first flowchart of a method for implementing MBMS congestion or overload indication according to an exemplary embodiment of the present disclosure. As shown in FIG. 10, the method includes the following acts S1002 to S1006.

At act S1002, a network element determines an MBMS to be suspended. The predetermined network element (network unit) in the embodiment of the present disclosure includes any one of: an MCE, an MME, an MBMS-GW, a BM-SC, an OAM and a GCS AS. For convenient description, only the MCE or the OAM is adopted for description as an example in the embodiment. In an exemplary embodiment, for centralized MCE, the MCE determines the MBMS to be suspended, while for distributed MCE, the OAM is adopted to determine the MBMS to be suspended. Before the act, an eNB may send congestion or overload indication information to the MCE or OAM. Congestion or overload may refer to multicast bearer user plane congestion or overload. The MCE or OAM receives the congestion or overload indication information, and determines the MBMS to be suspended. The MCE or OAM may adopt the following manners to determine the MBMS to be suspended. In a first manner, an MBMS counting procedure collects statistics about the number of influenced UE, and selects to suspend a corresponding MBMS of which the number of influenced UEs is relatively small according to a statistical result. In a second manner, if MBMSs on an original MCH are sequentially arranged according to priorities, that is, the last MBMS in the MCH has the lowest priority, an MCE or OAM may select one or more MBMSs at a tail in the MCH to be suspended, where one or more MBMSs may be suspended. In a third manner, if the MCE or OAM learns about the MBMSs which occupy relatively more MBMS resources, the MCE or OAM may select one or more MBMSs which occupy the relatively more MBMS resources to be suspended. The MCE or OAM may also comprehensively consider the three factors and adopt a more effective manner to suspend the corresponding MBMS. Specifically, the MCE or OAM comprehensively determines the MBMS to be suspended based on one or more of the following conditions: a counting result, the priority of the MBMS, a service attribute (such as rate and data volume) of the MBMS, a local strategy (such as an internal algorithm of the MCE or OAM and a setting of the operating company), an air interface multicast resource and the like. The OAM refers to a network manager, and is usually configured in a distributed MCE scenario (under such a scenario, the MCE is positioned in the eNB as a module of the eNB).

At act S1004, the network element sends indication information to the eNB. An MCE network element may send the indication information to the eNB through an M2 interface. An MME network element may send the indication information to the eNB through the MCE or directly send the indication information to the eNB through an S1-MME interface. An OAM network element may send the indication information through an existing interface with the eNB. Other network elements may send the indication information to the eNB through the MCE. The eNB mentioned herein may include all eNBs participating in MBSFN transmission in an influenced MBSFN area (for example, a congested or overloaded area), that is, the same indication information is sent to all the influenced eNBs. The MCE sends the indication information on the existing M2 interface through a new information element of an existing message (which is called as existing M2 interface signaling for short in the embodiment) or through a new message. The existing M2 interface signaling may include, for example, MBMS scheduling information. The indication information at least includes: an MBSFN area ID, and/or an MBMS ID and/or a timestamp. The MBMS ID refers to an ID (such as a Temporary Mobile Group Identity (TMGI) and an LCID) of the MBMS to be suspended. The timestamp is a time when specific MSI is configured on the eNB. By virtue of the timestamp, a reserved value is simultaneously configured on the MSI by all the eNBs in the MBSFN area at the time specified by the timestamp, that is, the timestamp is used to indicate a time when the influenced UEs (the MBMS is to be suspended) are simultaneously notified by the eNBs. The timestamp is intended to ensure that the eNBs in the congested or overloaded MBSFN area simultaneously send the MSI to the influenced UE. The timestamp may be an absolute time (for example, an absolute time relative to Jan. 1, 1900, taking a second as a unit) or a relative time (for example, a scheduling period: the number of radio frames or sub-frames). For example, {MBSFN area ID1; TMGI2, TMGI3; 40 ms} represents that TMGI2 and TMGI3 services in an MBSFN area1 are to be suspended, and the MSI is sent within an MCH scheduling period of 40 ms to indicate the MBMS to be suspended. Table 6 and Table 7 show two suspended service indication manners.

TABLE 6

| LCID1 | Stop MTCH1 = 3 |
| LCID2 | Stop MTCH2 = 2043 or 2046 |
| LCID2 | Stop MTCH2 = 5 |
| LCID3 | Stop MTCH3 = 2043 or 2046 |
| LCID3 | Stop MTCH3 = 10 |

TABLE 7

| LCID1 | Stop MTCH1 = 3 |
| LCID2 | Stop MTCH2 = 5 |
| LCID2 | Stop MTCH2 = 2043 or 2046 |
| LCID3 | Stop MTCH3 = 10 |
| LCID3 | Stop MTCH3 = 2043 or 2046 |

No matter whether the MCE adopts the existing M2 interface signaling or new signaling, the MCE is required to send updated MBMS scheduling information to the eNB. The ID of the MBMS to be suspended is deleted, and the eNB receiving the scheduling information determines the MBMS to be suspended, and updates MCCH information.

In addition, a suspending indication may also be arranged at a header of a table or a tail of the table. If LCID2 and LCID3 are to be suspended, the following Table 8 and Table 9 show schematic diagrams with a reserved value at the header of the table and the tail of the table respectively.

TABLE 8

| LCID2 | Stop MTCH2 = 2043 or 2046 |
| LCID3 | Stop MTCH3 = 2043 or 2046 |
| LCID1 | Stop MTCH1 = 3 |
| LCID2 | Stop MTCH2 = 5 |
| LCID3 | Stop MTCH3 = 10 |

TABLE 9

| LCID1 | Stop MTCH1 = 3 |
| LCID2 | Stop MTCH2 = 5 |
| LCID3 | Stop MTCH3 = 10 |
| LCID2 | Stop MTCH2 = 2043 or 2046 |
| LCID3 | Stop MTCH3 = 2043 or 2046 |

At act S1006, the eNB configures and sends the MSI.

Figure 11:
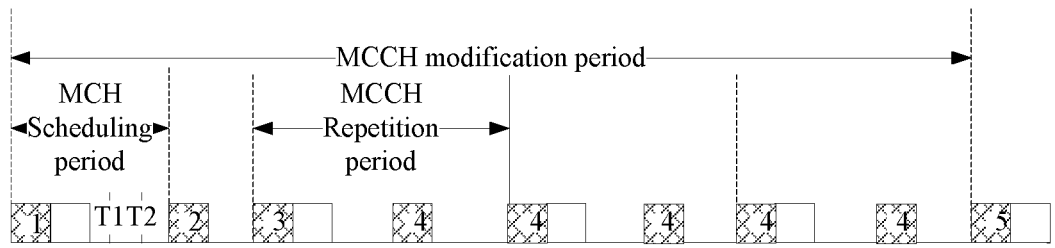
FIG. 11 is a schematic diagram of implementation of MBMS congestion or overload indication according to an exemplary embodiment of the present disclosure.

FIG. 11 is a schematic diagram of implementation of MBMS congestion or overload indication according to an exemplary embodiment of the present disclosure. As shown in FIG. 11, black squares in the figure represent the MSI, grey squares represent MCCH information in a first modification period, white squares represent MCCH information in a second modification period, and numbers 1, 2, 3, 4 and 5 in the black squares represent different scheduling information respectively.

The eNB configures the MSI and sends the MSI at the time indicated by the timestamp. The MSI includes a reserved value used for indicating that the corresponding LCID is to be suspended, and a content of the MSI is shown in Table 10 and Table 11.

TABLE 10

| LCID1 | Stop MTCH1 = 3 |
| LCID2 | Stop MTCH2 = 5 |
| LCID2 | Stop MTCH2 = 2043 or 2046 |
| LCID3 | Stop MTCH3 = 10 |

TABLE 11

| LCID1 | Stop MTCH1 = 3 |
| LCID2 | Stop MTCH2 = 2043 or 2046 |
| LCID3 | Stop MTCH3 = 10 |

TABLE 12

| LCID1 | Stop MTCH1 = 3 |
|---|---|
| LCID2 | Stop MTCH2 = 2047 |
| LCID3 | Stop MTCH3 = 8 |
| LCID2 | Stop MTCH2 = 2043 or 2046 |

The content of the MSI in "1" is shown in Table 10 or 11, and the content of the MSI in "2" is shown in Table 12.

In Table 10, LCID2 is an MBMS to be suspended, the reserved value 2043 or 2046 is used for indicating that LCID2 is to be suspended, and stop MTCH2=5 is used for indicating that a service of LCID2 is still being sent (but is to be suspended or interrupted). LCID2 is indicated twice in the MSI to: firstly indicate the MBMS to be suspended; secondly indicate that the MBMS is still being sent; and thirdly prevent influence on other MBMSs (such as LCID3).

In Table 11, LCID2 is an MBMS to be suspended, the reserved 2043 or 2046 is used for indicating that LCID2 is to be suspended, sub-frame position information of LCID2 is not indicated here, and under such a situation, the UE may continue receiving data of LCID2 at an original sub-frame position (such as 3-5). The UE may read the service LCID3 from an original sub-frame position (such as 5-10), or the UE starts blind detection from a sub-frame position 3 until required service data of LCID3 is detected.

In Table 12, LCID2 has been suspended, and correspondingly stop MTCH=2047.

It is supposed that the MCE or OAM sends the MBMS scheduling information at a time T1 and time T2 between "1" and "2".

If the MCE judges that there are multiple pieces of MBMS scheduling information in the timestamp, the MCE or OAM sends IDs of all MBMSs to be suspended in the latest MBMS scheduling information, such as T1:{MBSFN area ID1; TMGI2, TMGI3; 80 ms}. If the MCE or OAM determines that TMGI4 is also to be suspended at the time T2, {MBSFN area ID1; TMGI2, TMGI3, TMGI4; 80 ms} is sent at T2, and if {MBSFN area ID1; TMGI4; 80 ms} is sent at T2, it is represented that only TMGI4 is suspended.

Considering that an MCCH modification period is minimally 5.12 seconds and an MSI period is minimally 40 ms, the MBMS to be suspended may continue to be sent before the next MCCH modification period. That is, the content of the MSI is kept as Table 3-a or 3-b till the next MCCH modification period. "5" in the figure is the beginning of the next MCCH modification period, and the content of the MSI in "5" is shown in the following Table 13.

TABLE 13

| LCID1 | Stop MTCH1 = 3 |
|---|---|
| LCID2 | Stop MTCH3 = 8 |

In the embodiment of the present disclosure, the eNB may notify the MBMS to be suspended in one of the following manners: RRC signaling, L1 or L2 signaling and PDCP signaling. The RRC signaling may be existing RRC signaling, such as MCCH and a System Information Block (SIB), or new RRC signaling. The L1 or L2 signaling is physical layer or link layer signaling, which is also existing signaling, such as Physical Downlink Control Channel (PDCCH) signaling, or new signaling. The PDCP signaling may be implemented by adding an indication ID into a PDCP header of MBMS data (such as MTCH information).

At act S1008, the UE receiving the MSI performs further processing. The UE receives the MSI, and takes a next action according to the content of the MSI. If the MBMS the UE is receiving or is interested in receiving is to be suspended, the UE sends indication information, indicating that the service which is being received is to be interrupted, to the GCS AS through application layer signaling. If the AS determines to send trunking data through a unicast bearer according to the received indication information, the AS establishes the unicast bearer with the UE, and sends the trunking data. The UE may receive multiple MSI indications, the MSI received for the first time is shown in Table 14, and the MSI received for the second time is shown in Table 15.

TABLE 14

| LCID1 | Stop MTCH1 = 3 |
|---|---|
| LCID2 | Stop MTCH2 = 5 |
| LCID3 | Stop MTCH3 = 10 |
| LCID3 | Stop MTCH3 = 2043 or 2046 |

TABLE 15

| LCID1 | Stop MTCH1 = 3 |
|---|---|
| LCID2 | Stop MTCH2 = 5 |
| LCID3 | Stop MTCH3 = 0 |
| LCID2 | Stop MTCH2 = 2043 or 2046 |
| LCID3 | Stop MTCH3 = 2043 or 2046 |

After receiving the indication shown in Table 14, the UE sends the indication information to the AS. The AS establishes a unicast bearer for LCID3. If the unicast bearer for transmitting the service LCID3 has been established before the UE receives the MSI as shown in Table 15 and sends the indication information to the AS, the UE indicates the AS that LCID2 is to be suspended. If the unicast bearer for transmitting the service LCID3 has yet not been established, the UE indicates the AS that LCID2 and LCID3 needs to be suspended.

At the same time of sending the indication information to the AS, the UE performs the following operation according to the indication of the MSI: continuing reading data of an unsuspended MBMS (corresponding stop MTCH is a normal value) or stopping reading the suspended MBMS (corresponding stop MTCH=2047). If the ID of the suspended MBMS appears on the MCCH in the next MCCH modification period, it is represented that the MBMS has been recovered, and the UE sends indication information to the AS, indicating that multicast sending of the suspended service has been recovered, and requests the AS to release the unicast bearer established for the suspended service.

First Embodiment

Figure 12:
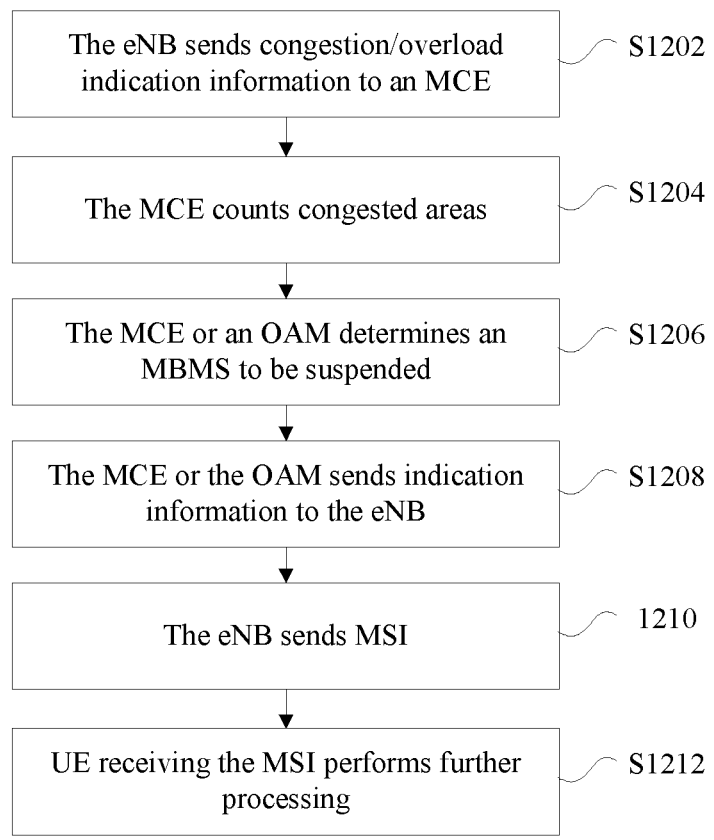
FIG. 12 is a second flowchart of a method for implementing MBMS congestion or overload indication according to an exemplary embodiment of the present disclosure.

For a scenario where an MCE sends an indication to an eNB through modified scheduling information, FIG. 12 is a second flowchart of a method for implementing MBMS congestion or overload indication according to an exemplary embodiment of the present disclosure. As shown in FIG. 12, the method for implementing suspending indication includes the following acts S1202 to S1212.

At act S1202, the eNB sends user plane congestion or overload indication information to the MCE. In an exemplary embodiment, whether MBMS user plane data is congested or overloaded or not is detected through one or more eNBs, where occurrence of congestion or overload to the one or more eNBs indicates that an MBSFN area to which the one or more eNBs belongs is congested or overloaded.

Congestion may refer to that a user plane data load reaches a preset threshold value. Overload may refer to that a network node may not be able to continue processing an additional user plane data load. The user plane data mentioned in the embodiment of the present disclosure may refer to MBMS data on a Physical Multicast Channel (PMCH). In an implementation process, whether the user plane data is congested or overloaded or not may be detected according to a judgment condition. The judgment condition is preconfigured or contained in the indication information received by the eNB. The eNB may judge whether the MBMS user plane data is congested or overloaded or not according to a preset rule, that is, the congestion or overload judgment condition is predefined, and if the eNB may determine that the predefined congestion or overload judgment condition is met by judgment, it may be determined that congestion or overload has occurred. The congestion or overload judgment condition, i.e. the set judgment rule, may be preset, and may also be contained in the indication information sent to the eNB. The indication information may be implemented by adopting existing M2 interface signaling and adding a new indication field, or, by directly adopting new M2 interface signaling.

In the exemplary embodiment, a content contained in the indication information may include, but not limited to, at least one of: (1) a congestion or overload ID; (2) one or more cell IDs, for example: Evolved Universal Terrestrial Radio Access Network (E-UTRAN) Cell Identifiers (ECIs) or E-UTRAN Cell Global Identifiers (ECGIs); (3) one or more Service Area Identifiers (SAIs); (4) one or more MBSFN area IDs; (5) one or more MBMS IDs, for example: TMGIs, and/or, MBMS session IDs (for example: session ID); or (6) a congestion or overload starting/ending ID, The congestion or overload ID is used for indicating whether a network is congested or overloaded. The cell IDs are used for identifying cells influenced by congestion or overload. The SAIs are used for identifying MBMS areas influenced by congestion or overload. The MBSFN area IDs are used for identifying congested or overloaded MBSFN areas. The TMGIs are used for identifying trunking services influenced by congestion or overload.

The MBSFN area IDs may be sent on an M2 interface only.

A content of congestion or overload starting/ending may include, but not limited to, at least one of: (1) starting (indicated by 1 or true); and (2) ending (indicated by 0 or false).

For congestion or overload starting/ending, in other words, congestion or overload starting is equivalent to that congestion or overload currently occurs, and congestion or overload ending is equivalent to that no congestion or overload currently occurs or the started congestion or overload has ended. Node congestion may refer to that an MBMS user plane data load in a network reaches a preset threshold value. Node overload may refer to that the network node is incapable of processing an additional MBMS user plane data load. The content of the reported MBMS congestion or overload information may include, but not limited to: if congestion is indicated by C and overload is indicated by O, for example:

{ECI1/MBSFN area ID1/SAI1: TMGI1, TMGI2, TMGI3; C,true},

{ECI2/MBSFN area ID1/SAI1: TMGI4, TMGI6; O,false} and

{ECI3/MBSFN area ID2/SAI1: TMGI10; C,false}.

In the examples, TMGI1, TMGI2 and TMGI3 in ECI1 are congested; overload of TIMGI5 and TMGI6 in ECI2 ends; and congestion of TMGI10 in ECI3 ends.

The congestion or overload indication information may be modified in a sending process. The ECIs may be usually modified into MBMS SAIs, and if the MCE modifies the ECIs in the received indication information into the SAIs, the GCS AS may determine the congested or overloaded MBMS areas according to the received indication information.

Under a condition that the overload indication O is 1 (True), the congestion indication C may not be sent; or although the congestion indication C is sent, UE may ignore the congestion indication C. The scenario where the congestion or overload starting/ending event occurs to the network node refers to: switching from a starting state to an ending state, or switching from the ending state to the starting state. That is, in case of switching from no congestion or overload (equivalent to that last congestion or overload has ended) to starting to have congestion or overload (equivalent to that congestion or overload has currently occurred), the eNB is required to report the state. In case of switching from occurrence of congestion or overload (equivalent to that the congestion or overload has currently started) to no congestion or overload (equivalent to that the congestion or overload has currently ended), the eNB is required to report the state. Moreover, under a condition that the eNB detects a mutual change of the congestion state and the overload state, eNB is also required to report the state. In this exemplary embodiment, for example, C=congestion indication, and is identified by adopting {0,1}; and O=overload indication, and is identified by adopting {0,1}. Once identifiers of C and/or O change, the eNB is required to report the change. In a word, if the congestion or overload starting or ending state does not change, the eNB is not required to report the indication. In this way, the AS may accurately master the congestion or overload state of the MBMS. The eNB may be restarted after a failure, and if a congestion or overload change occurs to the eNB, the eNB may not know about the change, so that the eNB always needs to report congestion or overload indication information once after every restart. The eNB may report the congestion or overload indication information under event triggering or periodically report the congestion or overload indication information.

At act S1204, the MCE counts influenced MBMSs. The MCE collects statistics about the number of UE which receives or is interested in receiving the MBMSs in the MBSFN area influenced by congestion or overload through a counting procedure. Counting is intended to enable the MCE to master the number of the UEs which receive or are interested in receiving the influenced MBMSs, and a counting result is determined as one of determinant factors for MBMS suspending. Statistics may be collected for UEs in an RRC Connected mode in the counting procedure of the MCE, and it is considered here that UE receiving a trunking (MCPTT) service is usually in a connected state. The counting process is optional, that is, the MCE may select an MBMS to be suspended according to other conditions without the counting procedure.

At act S1206, the MCE selects the MBMS to be suspended. The MCE comprehensively determines the MBMS to be suspended according to one or more of the following conditions: the counting result, a priority of the MBMS, a service attribute (such as rate and data volume) of the MBMS, a local strategy (such as an internal algorithm of the MCE and a setting of an operating company), an air interface multicast resource and the like, such as an MBMS corresponding to a relatively smaller number of UE in the MBSFN area, and/or an MBMS with a relatively lower priority, and/or an MBMS with a high rate or large data volume and/or an MBMS specified by the operating company to be suspended.

At act S1208, the MCE sends indication information to the eNB. The indication information may be modified scheduling information, i.e. MBMS scheduling information, or may be new signaling. The indication information may be sent through the M2 interface. The scheduling information at least includes: an MBSFN area ID with a suspending requirement, an MBMS ID (such as a TMGI) and/or a timestamp. The MBSFN area ID is used for indicating an MBSFN area to which the MBMS to be suspended belongs. The MBMS ID identifies the MBMS to be suspended. The timestamp is used for indicating a time when the eNB sends updated MSI. The timestamp may be an absolute time (such as an absolute time relative to Jan. 1, 1900, taking a second as a unit), or a relative time (such as a scheduling period: the number of radio frames or sub-frames).

At act S1210, the eNB configures and sends the MSI. The eNB sends the MSI at the time indicated by the timestamp.

At act S1212, the UE reads the MSI, and sends indication information to an AS. The UE reads the MSI from a MAC data packet, and determines the MBMS to be suspended according to the indication of the MSI. If the service is not stopped, the UE sends the indication information, indicating that the MBMS the UE is receiving or is interested in receiving is to be interrupted, to the GCS AS through application layer signaling. The AS receiving the indication may establish a unicast bearer for receiving for the UE or queue the suspended service or seize an air interface resource for sending by virtue of a trunking service with a high priority.

Second Embodiment

Figure 13:
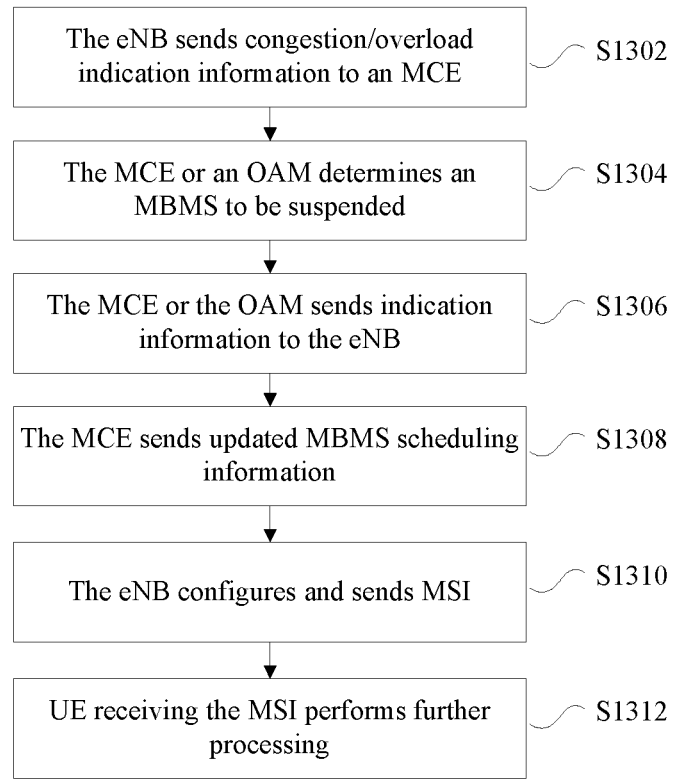
FIG. 13 is a third flowchart of a method for implementing MBMS congestion or overload indication according to an exemplary embodiment of the present disclosure.

For a scenario where an MCE sends an indication to an eNB through new M2 signaling, FIG. 13 is a third flowchart of a method for implementing MBMS congestion or overload indication according to an exemplary embodiment of the present disclosure. As shown in FIG. 13, implementation of suspending indication includes the following acts S1302 to S1312.

At act S1302, the eNB sends congestion or overload indication information to the MCE. The act is the same as act S1202, and will not be elaborated herein.

At act S1304, the MCE or an OAM selects an MBMS to be suspended. The MCE comprehensively determines the MBMS to be suspended according to one or more of the following conditions: a counting result, a priority of the MBMS, a service attribute (such as rate and data volume) of the MBMS, a local strategy (such as an internal algorithm of the MCE or OAM and a setting of the operating company), an air interface multicast resource and the like, such as an MBMS corresponding to a relatively smaller number of UE in the MBSFN area, and/or an MBMS with a relatively lower priority, and/or an MBMS with a high rate or large data volume and/or an MBMS specified by the operating company to be suspended.

At act S1306, the MCE or the OAM sends indication information to the eNB. The MCE may send the indication information to the eNB through an M2 interface. The indication information may be new M2 interface signaling. The indication information may be sent before or after scheduling information in act 1308. The indication information at least includes: an MBSFN area ID with a suspending requirement, an MBMS ID (such as a TMGI) and/or a timestamp. The timestamp is used for indicating a time when the eNB sends updated MSI. The timestamp may be an absolute time (such as an absolute time relative to Jan. 1, 1900, taking a second as a unit), or a relative time (such as a scheduling period: the number of radio frames or sub-frames).

At act S1308, the MCE sends updated MBMS scheduling information to the eNB. The updated MBMS scheduling information is used for indicating the MBMS to be suspended, that is, the suspended MBMS is deleted from the updated scheduling information.

At act S1310, the eNB configures and sends the MSI. The act is the same as act S1210, and will not be elaborated herein.

At act S1312, the UE reads the MSI, and sends indication information to a GCS AS. The act is the same as act S1212, and will not be elaborated herein.

Third Embodiment

Figure 14:
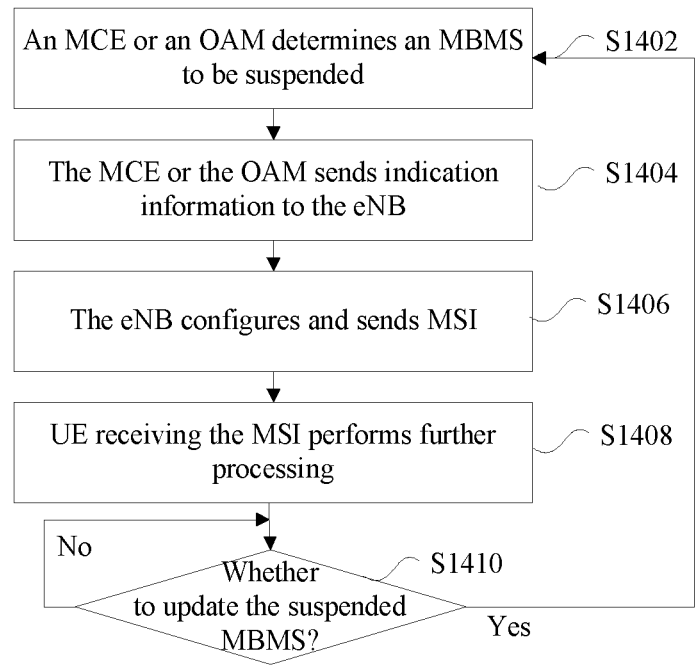
FIG. 14 is a fourth flowchart of a method for implementing MBMS congestion or overload indication according to an exemplary embodiment of the present disclosure.

For a scenario where a suspended service is updated, FIG. 14 is a fourth flowchart of a method for implementing MBMS congestion or overload indication according to an exemplary embodiment of the present disclosure. As shown in FIG. 14, implementation of suspending indication includes the following acts S1402 to S1410.

At act S1402, an MCE or an OAM selects an MBMS to be suspended.

The MCE or the OAM comprehensively determines an MBMS required to be recovered based on any or a combination of received indication information, service related information, an air interface resource, a local strategy and the like, and sends, to an eNB, updated scheduling information used for indicating that the MBMS is to be suspended.

At act S1404, the MCE or the OAM sends indication information to the eNB. The indication information at least includes: a recovered suspended MBSFN area ID, an MBMS ID and a timestamp.

At act S1406, the eNB configures and sends MSI. The eNB configures and sends the MSI which indicates the suspended MBMS ID. The act is the same as act S1210, and will not be elaborated herein.

At act S1408, the UE reads the MSI, and sends indication information to a GCS AS. The UE sends the indication information to the AS through application layer signaling: the suspended service has been recovered. The AS may perform further processing, such as stopping a corresponding trunking service sent by a unicast bearer, after receiving the indication information.

At act S1410: whether it is needed to update the suspended MBMS or not is judged, act S1402 is executed if it is needed to update the suspended MBMS, otherwise act S1410 is executed.

The MCE or the OAM judges whether it is needed to update the suspended MBMS or not. The MCE or the OAM may perform judging according to any or a combination of the following conditions: the received indication information, a counting result, a priority of the MBMS, a service attribute (such as rate and data volume) of the MBMS, a local strategy (such as an internal algorithm of the MCE or OAM and a setting of the operating company), an air interface multicast resource and the like. For example, the MCE receives congestion or overload indication information (that is, after the service is suspended, congestion or overload still exists). If it is needed to update the suspended MBMS (for example, an MBMS to be suspended is added), the MCE or the OAM selects a new MBMS to be suspended, otherwise the MCE or the OAM continues judging whether it is needed to update the suspended MBMS or not.

Figure 15:
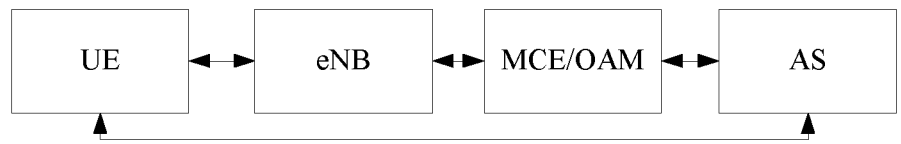
FIG. 15 is a block diagram of an apparatus for implementing MBMS congestion or overload indication according to an embodiment of the present disclosure.

In order to implement the abovementioned MBMS suspending indication method, an embodiment of the present disclosure further provides an MBMS suspending indication system. FIG. 15 is a block diagram of an apparatus for implementing MBMS congestion or overload indication according to an embodiment of the present disclosure. As shown in FIG. 15, the apparatus includes: UE, an eNB, another network element and a GCS AS. The UE is arranged to receive indication information MSI and notify the AS. The eNB is arranged to detect congestion or overload and send the indication information to the UE and the other network element. The other network element is arranged to receive the congestion or overload indication information sent by the eNB, and is further arranged to send suspending indication information to the eNB. The other network element may include any one of: an MCE, an MME, an MBMS-GW, a BM-SC, an OAM and a GCS AS. The AS is arranged to receive notification information of the UE. In the exemplary embodiment, the UE is further arranged to judge an MBMS to be suspended according to a reserved value in the received MSI or RRC signaling or L1 or L2 signaling or PDCP signaling. In the exemplary embodiment, the eNB is further arranged to set the reserved value in the MSI or send the RRC signaling or the L1 or L2 signaling or the PDCP signaling. The reserved value in the MSI may include that: when stop MTCH=2046 or 2043, it is indicated that the corresponding MBMS is to be suspended.

Figure 16:
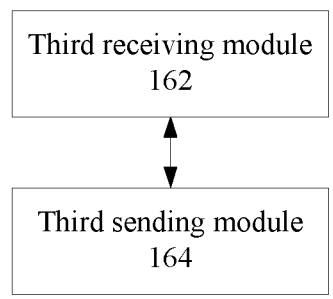
FIG. 16 is a first block diagram of an apparatus for implementing MBMS congestion or overload indication according to an exemplary embodiment of the present disclosure.

In order to implement the abovementioned suspending indication method, the embodiments of the present disclosure further provide UE. FIG. 16 is a first block diagram of an apparatus for implementing MBMS congestion or overload indication according to an exemplary embodiment of the present disclosure. As shown in FIG. 16, the UE includes a third receiving module 162 and a third sending module 164. Each module will be briefly described below.

The third receiving module 162 is arranged to receive MSI including a reserved value or RRC signaling or L1 or L2 signaling or PDCP signaling, and judge an MBMS to be suspended according to the MSI or the RRC signaling or the L1 or L2 signaling or the PDCP signaling, and is further arranged to receive trunking communication service by adopting an MBMS bearer or a unicast bearer.

The third sending module 164 interacts with the third receiving module, and is arranged to send notification and indication information to an AS.

Figure 17:
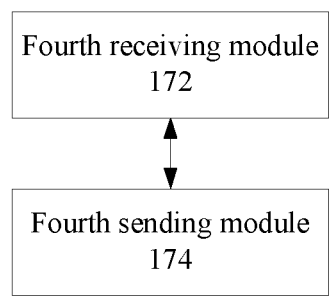
FIG. 17 is a second block diagram of an apparatus for implementing MBMS congestion or overload indication according to an exemplary embodiment of the present disclosure.

In order to implement the abovementioned trunking communication method, the embodiments of the present disclosure further provide an eNB. FIG. 17 is a second block diagram of an apparatus for implementing MBMS congestion or overload indication according to an exemplary embodiment of the present disclosure. As shown in FIG. 17, the eNB includes a fourth receiving module 172 and a fourth sending module 174. Each module will be briefly described below.

The fourth receiving module 172 is arranged to receive trunking MBMS data of a network side, and is arranged to judge network congestion or overload according to the received data, and receive suspending indication information sent by an MCE.

The fourth sending module 174 interacts with the fourth receiving module 172, and is arranged to set an MBMS indicated by a reserved value in MSI to be suspended and send the MSI to UE.

The fourth sending module 174 is further arranged to send RRC signaling or L 1 or L2 signaling or PDCP signaling indicating the suspended MBMS to the UE.

Functions of the third receiving module 162, the third sending module 164, the fourth receiving module 172 and the fourth sending module 174 are realized by part or all of the first sending module 64, first receiving module 72, second sending module 74 and second receiving module 82 in the embodiments of the present disclosure.

Obviously, those skilled in the art should know that each module or each act of the embodiments of the present disclosure may be implemented by a universal computing apparatus, and the modules or acts may be concentrated on a single computing apparatus or distributed on a network formed by a plurality of computing devices, and may optionally be implemented by program codes executable for the computing devices, so that the modules or acts may be stored in a storage apparatus for execution with the computing devices, the shown or described acts may be executed in sequences different from those described here in some circumstances, or may form each integrated circuit module respectively, or multiple modules or acts therein may form a single integrated circuit module for implementation. As a consequence, the embodiments of the present disclosure are not limited to any specific hardware and software combination.

The above is only the exemplary embodiment of the embodiments of the present disclosure and not intended to limit the embodiments of the present disclosure. For those skilled in the art, the embodiments of the present disclosure may have various modifications and variations. Any modifications, equivalent replacements, improvements and the like made within the principle of the embodiments of the present disclosure shall fall within the scope of protection defined by the appended claims of the present disclosure.

INDUSTRIAL APPLICABILITY

As mentioned above, by the abovementioned embodiments and exemplary implementation modes, the problem of how to notify the eNB and how to notify the influenced UEs by the eNB when the network element selects to suspend the MBMS in the related technology is solved, and effects of timely notifying the eNB and the UE and processing the suspended service by the UE are achieved.

What is claimed is:

1. A method for processing indication information, comprising:

determining, by a predetermined network element, a Multimedia Broadcast Multicast Service (MBMS) to be suspended; and sending, by the predetermined network element to an Evolved Node B (eNB), indication information used for indicating that the MBMS is to be suspended, wherein the indication information is used for indicating the eNB receiving the indication information to send Multicast Channel (MCH) Scheduling Information (MSI) to User Equipment (UE), and the MSI comprises a specific value used for notifying the UE of the MBMS to be suspended;

receiving, by a UE, Multicast Channel (MCH) Scheduling Information (MSI) sent by an Evolved Node B (eNB), wherein the MSI comprises a specific value used for notifying User Equipment (UE) of a Multimedia Broadcast Multicast Service (MBMS) to be suspended; and sending, to an Application Server (AS), indication information used for indicating to process the MBMS to be suspended, and performing an operation according to a Stop Multicast Traffic Channel (MTCH) indication corresponding to the MBMS, and continuing monitoring subsequent MSI and Multicast Control Channel (MCCH) message; and under a condition that the MBMS is configured on an MCCH in a next MCCH modification period, receiving the MBMS by adopting a multicast bearer, and requesting the AS to release a unicast bearer corresponding to the MBMS.

2. The method as claimed in claim 1, wherein the MSI is sent when the eNB receives the indication information sent by the predetermined network element and data of the MBMS to be suspended continues to be sent at an air interface; or, the MSI is sent after the eNB receives the indication information sent by the predetermined network element and data of the MBMS to be suspended is stopped to be sent at an air interface.

3. The method as claimed in claim 1, wherein the indication information contains MBMS scheduling information and/or at least one of the following information: a Multicast/Broadcast over Single Frequency Network (MBSFN) area Identifier (ID) of an MBSFN area to which the MBMS belongs, an MBMS ID identifying the MBMS or a timestamp used for indicating a time for the eNB to send the MSI to the UE.

4. The method as claimed in claim 1, wherein the predetermined network element determines the MBMS to be suspended in at least one of the following manners:

after congestion or overload indication information about user plane congestion or overload is received, statistics about the number of UEs influenced by the user plane congestion or overload is collected, and an MBMS of which the number of influenced UEs is smaller than a predetermined number is selected to be suspended;

priorities of MBMSs on an MCH are sequenced, and an MBMS of which a priority is lower than a predetermined priority is selected to be suspended;

resources occupied by MBMSs are determined, and an MBMS which occupies an amount of resources exceeding a predetermined value is selected to be suspended;

a corresponding MBMS determined to be used for reducing user plane radio resources according to a local algorithm of the predetermined network element is selected to be suspended;

an MBMS for alleviating the user plane congestion or overload is selected to be suspended;

an MBMS of which a service rate exceeds a predetermined rate is selected to be suspended;

an MBMS which is not stopped within a predetermined time range is selected to be suspended;

an MBMS of which a data volume is larger than a predetermined data volume is selected to be suspended; or an MBMS specified, by an operating company, to be suspended is selected to be suspended.

5. The method as claimed in claim 1, wherein the predetermined network element comprises one of:

a Multi-cell/Multicast Coordination Entity (MCE), a Mobility Management Entity (MME), an MBMS Gateway (MBMS-GW), a Broadcast Multicast Service Center (BM-SC), an OAM or an Application Server (AS).

6. The method as claimed in claim 1, wherein after sending, by the predetermined network element to the eNB, indication information used for indicating that the MBMS is to be suspended, the method further comprises:

receiving, by the eNB from the predetermined network element, the indication information used for indicating that the MBMS is to be suspended; and sending, by the eNB, the MSI to the UE according to the indication information, wherein the MSI comprises the specific value used for notifying the UE of the MBMS to be suspended.

7. The method as claimed in claim 6, wherein the indication information contains MBMS scheduling information and/or at least one of the following information: a Multicast/Broadcast over Single Frequency Network (MBSFN) area Identifier (ID) of an MBSFN area to which the MBMS belongs, an MBMS ID identifying the MBMS or a timestamp used for indicating a time for the eNB to send the MSI to the UE.

8. The method as claimed in claim 6, wherein the method further comprises: sending, by the eNB, suspending notification information to the UE according to the indication information in one of the following manners:

Radio Resource Control (RRC) signaling, Layer 1 or Layer 2 (L1 or L2) signaling or Packet Data Convergence Protocol (PDCP) signaling.

9. A method for processing indication information, comprising:

receiving Multicast Channel (MCH) Scheduling Information (MSI) sent by an Evolved Node B (eNB), wherein the MSI comprises a specific value used for notifying User Equipment (UE) of a Multimedia Broadcast Multicast Service (MBMS) to be suspended; and processing the MBMS according to the received MSI;

wherein processing the MBMS according to the received MSI comprises:

sending, to an Application Server (AS), indication information used for indicating to process the MBMS to be suspended, and performing an operation according to a Stop Multicast Traffic Channel (MTCH) indication corresponding to the MBMS, and continuing monitoring subsequent MSI and Multicast Control Channel (MCCH) message; and under a condition that the MBMS is configured on an MCCH in a next MCCH modification period, receiving the MBMS by adopting a multicast bearer, and requesting the AS to release a unicast bearer corresponding to the MBMS.

10. A User Equipment (UE), which comprises a hardware processor arranged to execute program modules, and the program modules comprising:

a second receiving module, arranged to receive Multicast Channel (MCH) Scheduling Information (MSI) sent by an Evolved Node B (eNB), wherein the MSI comprises a specific value used for notifying the UE of a Multimedia Broadcast Multicast Service (MBMS) to be suspended; and a processing module, arranged to process the MBMS according to the received MSI;

wherein the processing module comprises:

a determination unit, arranged to send, to an Application Server (AS), indication information used for indicating to process the MBMS to be suspended, perform an operation according to a Stop Multicast Traffic Channel (MTCH) indication corresponding to the MBMS, and continue monitoring subsequent MSI and Multicast Control Channel (MCCH) message; and a requesting unit, arranged to, under a condition that the MBMS is configured on an MCCH in a next MCCH modification period, receive the MBMS by adopting a multicast bearer, and request the AS to release a unicast bearer corresponding to the MBMS.

11. The method as claimed in claim 2, wherein the predetermined network element comprises one of:
 a Multi-cell/Multicast Coordination Entity (MCE), a Mobility Management Entity (MME), an MBMS Gate-Way (MBMS-GW), a Broadcast Multicast Service Center (BM-SC), an OAM or an Application Server (AS).

12. The method as claimed in claim 3, wherein the predetermined network element comprises one of:
 a Multi-cell/Multicast Coordination Entity (MCE), a Mobility Management Entity (MME), an MBMS Gate-Way (MBMS-GW), a Broadcast Multicast Service Center (BM-SC), an OAM or an Application Server (AS).

13. The method as claimed in claim 4, wherein the predetermined network element comprises one of:
 a Multi-cell/Multicast Coordination Entity (MCE), a Mobility Management Entity (MME), an MBMS Gate-Way (MBMS-GW), a Broadcast Multicast Service Center (BM-SC), an OAM or an Application Server (AS).

14. A system for processing indication information, comprising the UE as claimed in claim 10, further comprising a predetermined network element which comprises a hardware processor arranged to execute program modules, and the program comprising:
 a determination module, arranged to determine a Multimedia Broadcast Multicast Service (MBMS) to be suspended; and
 a first sending module, arranged to send, to an Evolved Node B (eNB), indication information used for indicating that the MBMS is to be suspended, wherein the indication information is used for indicating the eNB receiving the indication information to send Multicast Channel (MCH) Scheduling Information (MSI) to User Equipment (UE), and the MSI comprises a specific value used for notifying the UE of the MBMS to be suspended.

15. The system according to claim 14, wherein the MSI is sent when the eNB receives the indication information sent by the predetermined network element and data of the MBMS to be suspended continues to be sent at an air interface; or, the MSI is sent after the eNB receives the indication information sent by the predetermined network element and data of the MBMS to be suspended stops being sent at an air interface.

16. The system according to claim 14, wherein the determination module comprises at least one of:
 a first selection unit, arranged to, after congestion or overload indication information about user plane congestion or overload is received, collect statistics about the number of UEs influenced by the user plane congestion or overload, and select to suspend an MBMS of which the number of influenced UEs is smaller than a predetermined number;
 a second selection unit, arranged to sequence priorities of MBMSs on an MCH, and select to suspend an MBMS of which a priority is lower than a predetermined priority;
 a third selection unit, arranged to determine resources occupied by MBMSs, and select to suspend an MBMS which occupies an amount of resources exceeding a predetermined value;
 a fourth selection unit, arranged to select to suspend a corresponding MBMS determined to be used for reducing user plane radio resources according to a local algorithm of the predetermined network element;
 a fifth selection unit, arranged to select to suspend an MBMS for alleviating the user plane congestion or overload;
 a sixth selection unit, arranged to select to suspend an MBMS of which a service rate exceeds a predetermined rate;
 a seventh selection unit, arranged to select to suspend an MBMS which is not stopped within a predetermined time range;
 an eighth selection unit, arranged to select to suspend an MBMS of which a data volume is larger than a predetermined data volume; or
 a ninth selection unit, arranged to select to suspend an MBMS which is specified, by an operating company, to be suspended.

17. The system as claimed in claim 14, further comprising an apparatus for processing indication information applied to the eNB and comprising a hardware processor arranged to execute program modules comprising:
 a first receiving module, arranged to receive, from a predetermined network element, indication information used for indicating that a Multimedia Broadcast Multicast Service (MBMS) is to be suspended; and
 a second sending module, arranged to send Multicast Channel (MCH) Scheduling Information (MSI) to User Equipment (UE) according to the indication information, wherein the MSI comprises a specific value used for notifying the UE of the MBMS to be suspended.

18. A system for processing indication information, comprising the apparatus for processing indication information, which is applied to UE, as claimed in claim 10, further comprising: an apparatus for processing indication information applied to the eNB and comprising a hardware processor arranged to execute program modules comprising:
 a first receiving module, arranged to receive, from a predetermined network element, indication information used for indicating that a Multimedia Broadcast Multicast Service (MBMS) is to be suspended; and
 a second sending module, arranged to send Multicast Channel (MCH) Scheduling Information (MSI) to User Equipment (UE) according to the indication information, wherein the MSI comprises a specific value used for notifying the UE of the MBMS to be suspended.

* * * * *